United States Patent [19]
Heubner

[11] Patent Number: 4,720,150
[45] Date of Patent: Jan. 19, 1988

[54] BRAKE-PRESSURE CONTROL SYSTEM

[75] Inventor: Wilheim Heubner, Itzgrund, Fed. Rep. of Germany

[73] Assignee: FAG Kugelfischer Georg Schafer (KGaA), Fed. Rep. of Germany

[21] Appl. No.: 890,006

[22] Filed: Jul. 24, 1986

[30] Foreign Application Priority Data

Jul. 27, 1985 [DE] Fed. Rep. of Germany ....... 3527019

[51] Int. Cl.$^4$ ........................... B60T 13/00; B60T 8/18
[52] U.S. Cl. .................................... 303/6 C; 303/22 R
[58] Field of Search ............... 303/6 C, 10, 22 R, 110, 303/11, 234, 22 A, 23 R, 116; 188/195

[56] References Cited

U.S. PATENT DOCUMENTS

| | | | |
|---|---|---|---|
| 3,297,368 | 1/1967 | Cumming | 303/22 R |
| 3,306,678 | 2/1967 | Lepelletier | 303/22 R |
| 3,645,584 | 2/1972 | Leiber et al. | 303/10 |
| 4,418,966 | 12/1983 | Hattuig | 303/100 |
| 4,623,200 | 11/1986 | Ando et al. | 303/22 R |

FOREIGN PATENT DOCUMENTS

| | | |
|---|---|---|
| 1780560 | 2/1972 | Fed. Rep. of Germany . |
| 1680818 | 12/1972 | Fed. Rep. of Germany . |
| 2302763 | 7/1974 | Fed. Rep. of Germany .... 303/22 R |

Primary Examiner—Andres Kashnikow
Assistant Examiner—T. E. Newholm
Attorney, Agent, or Firm—Ostrolenk, Faber, Gerb & Soffen

[57] ABSTRACT

A vehicular braking system wherein the brake circuit for the rear axle operates at a reduced pressure compared to master cylinder pressure that is applied directly to the brake circuit for the front axle, is provided with a pump that operates continuously during braking to draw fluid from the rear brake circuit and deliver same to the front brake circuit to essentially eliminate hysteresis, typical to prior art braking systems, that results in overbraking of the rear axle when master cylinder pressure is being reduced.

13 Claims, 3 Drawing Figures

BRAKE-PRESSURE CONTROL SYSTEM

BACKGROUND OF THE INVENTION

The present invention relates to a brake pressure control means that reduces or eliminates hysteresis effects in hydraulic braking systems for vehicles in which a controller reduces brake pressure on the rear axle as a function of static and load distribution referred to the front axle.

Federal Republic of Germany Patent Application OS No. 16 80 818 discloses a brake-pressure control system in which pressure in the brake circuit for the rear axle increases by a reduced amount as compared to pressure in the brake circuit for the front axle. This pressure difference is obtained by operating a control valve and results in an input-output pressure diagram for the rear axle that is a bent line during braking. Upon the reduction of braking pressure, the control valve remains closed until the pressure in the unreduced (front) brake circuit is equal to the pressure in the reduced (rear) brake circuit. In the input-output pressure diagram, the return curve for the rear brake circuit is initially a straight line parallel to the axis and then moves along the unreduced excess pressure line for the front circuit. Since the return curve for the rear axle does not correspond to the pressure increase curve, hysteresis results, so that the rear axle is over-braked initially while braking pressure is reduced.

Federal Republic of Germany Patent Application OS No. 17 80 560 discloses a system that attempts to avoid the disadvantages described above by providing a storage space which receives excess fluid from the rear axle circuit upon a reduction of braking pressure. This requires that the stroke of the master cylinder be of increased length and, upon multiple actuations of the brake pedal in a manner such that there is pressure buildup and reduction without complete relief, the capacity of the storage space is soon exhausted.

For brake systems in general, and particularly in those brake systems that are provided with antilocking devices, it is, however, desirable that the course of the return characteristic curve correspond to the course of the characteristic curve upon the buildup of the pressure so that no hysteresis is present.

SUMMARY OF THE INVENTION

The object of the present invention is to improve a brake pressure control system so that only a slight hysteresis effect, if any, occurs and that the courses of the characteristic curves of the pressure buildup and decrease are essentially the same under all operating conditions.

This object is achieved by utilizing a pump to draw brake fluid from the brake circuit (rear) of reduced pressure and deliver that fluid to the brake circuit (front) of unreduced pressure during the time when braking pressure is being relaxed. A check valve is provided downstream of the pump to prevent reverse fluid flow. Said pump is operated by the same switch that operates the conventional brake light switch.

Another object of this invention is to provide a brake pressure control system wherein braking pressure for the rear axle is idealized for a braking system in which the braking pressure for the rear axle exceeds that for the front axle.

BRIEF DESCRIPTION OF THE DRAWINGS

This invention will be explained by reference to the accompanying drawings in which.

DESCRIPTION OF A PREFERRED EMBODIMENT

Figure 1:
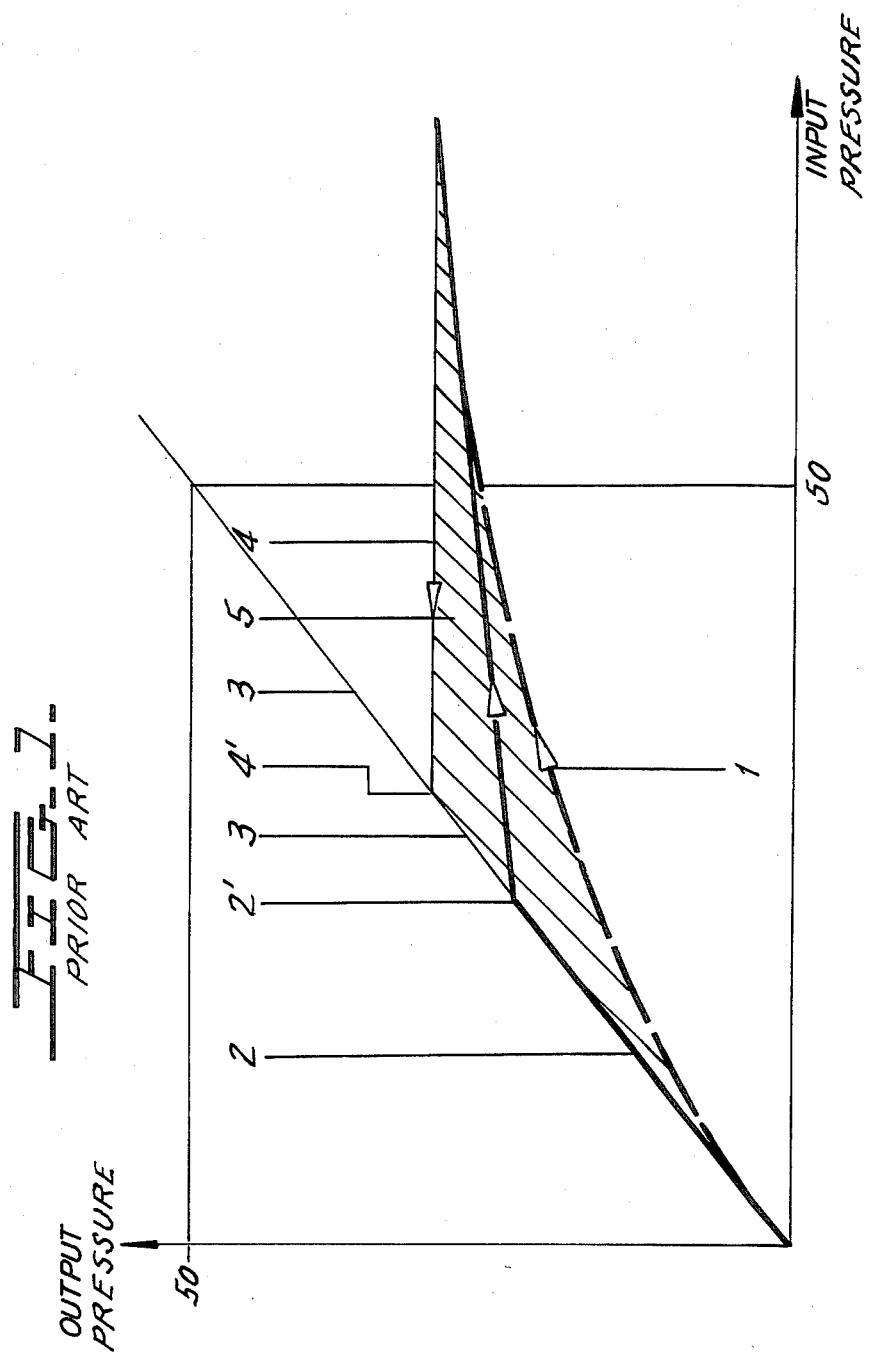
FIG. 1 is a characteristic curve of input-output pressure achieved with conventional brake-pressure controllers.

Now referring to the drawings, and more particularly to the input-output pressure characteristic curves of FIG. 1, wherein the input pressure coming from a conventional master cylinder (not shown) is plotted on the ordinate and the output pressure applied to the rear axle is plotted on the abscissa. The ideal course of an input-output pressure characteristic curve for a given state of loading of a vehicle is indicated by dash line 1. In the case of prior art brake pressure inflection controllers where pressure applied to the rear brake circuit is reduced below the pressure of the master cylinder when the latter pressure exceeds a predetermined value, the pressure buildup in the front and rear brake circuits takes place in accordance with the characteristic curve marked 2 which approximates ideal curve 1. Beyond the point of inflection 2' of characteristic curve 2, the master cylinder pressure and the front brake circuit continue at a relatively steep rate indicated by line segment 3, and the characteristic curve 2 continues upward at a very low rate. This difference in pressure between the front and rear brake circuits results from closing of a pressure control valve. As input pressure or braking pressure applied by the master cylinder falls, pressure in the rear axle brake circuit remains at the same level until the input pressure has dropped to such an extent that the control valve opens. That is, brake pressure initially follows line 4 which is parallel to the abscissa and then, from the point of inflection 4' follows along straight line 3. Hatched region 5 represents the hysteresis effect that results in over-braking of the rear axle as master cylinder pressure is being relieved.

Figure 2:
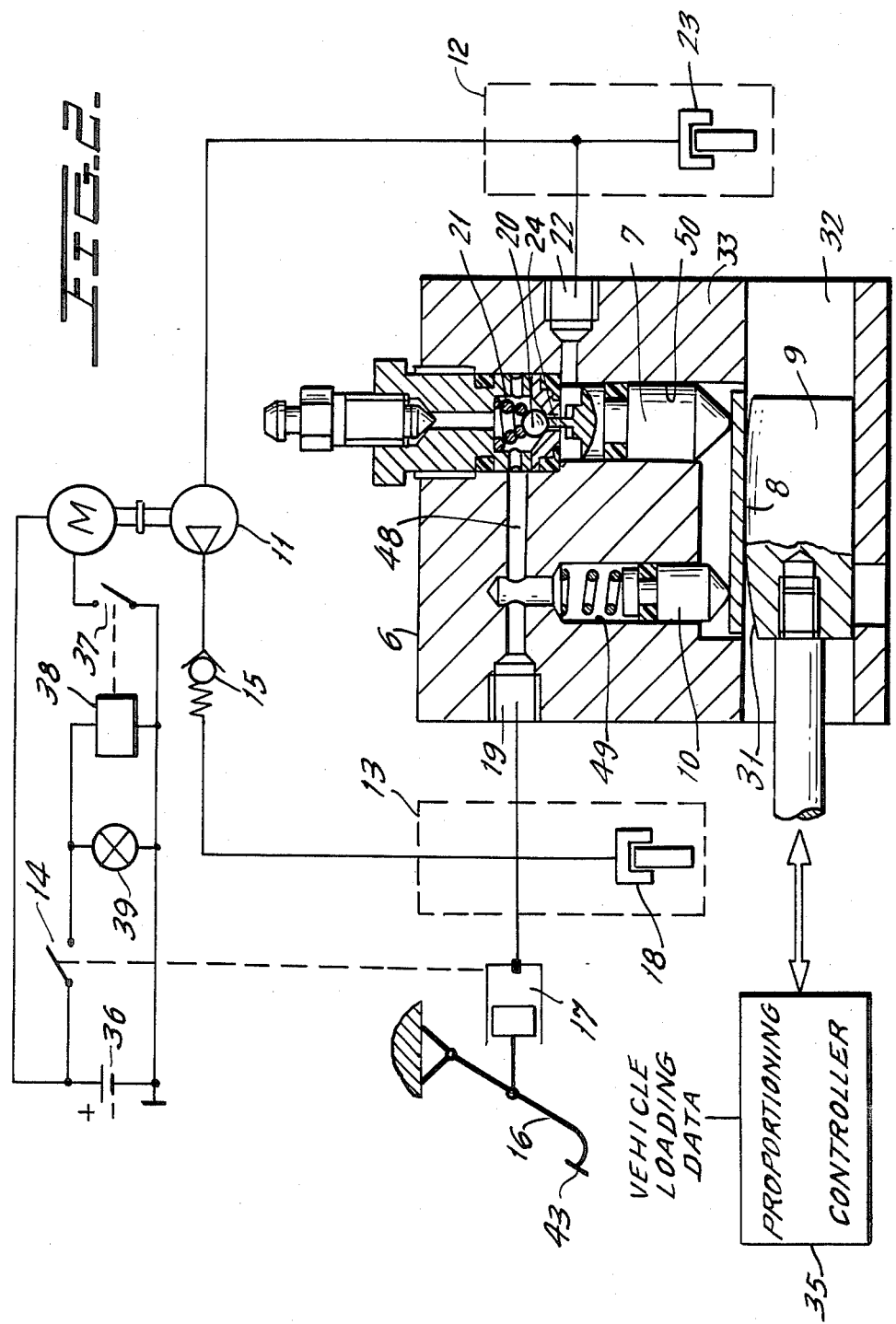
FIG. 2 is a schematic of a brake-pressure control system constructed according to teachings of the instant invention.

As will hereinafter be seen, the brake-pressure control system of FIG. 2 includes main controller 6 which makes it possible for pressure buildup in rear brake circuit 12 to take place along the ideal curve 1. Balance beam 8, which actuates control piston 7 of controller 6, is pivotably mounted on the upper convex surface 31 of support 9. The latter is slidably mounted within horizontal bore 32 of body 33 for main controller 6 and is positionable within the bore 32 by proportioning controller 35 which receives vehicle loading data that is derived from static and dynamic distribution of loads on the vehicle axles.

Convex surface 31 is of non-uniform curvature so that the pivot provided by surface 31 for beam 8 effectively moves along the latter depending upon the angular inclination thereof. Pump 11 also contributes to the pressure characteristic of rear circuit 12. In particular, pump 11 delivers fluid from rear circuit 12 through check valve 15 to front circuit 13 whenever pressure at the output of master cylinder 17 exceeds a predetermined level.

Motor M for driving pump 11 is actuated by battery 36 through a circuit that includes normally open switch 37 which is closed when solenoid 38 is energized. The latter is in parallel with brake light switch 39 and the parallel combination is connected to battery 36 through normally open brake light switch 14 that is actuated in response to pressure within master cylinder 17 rising above a predetermined level, usually through operation of pivoted lever 16 having brake pedal 43 at its lower end.

Body 33 of main controller 6 is also provided with input port 19, output port 22 and fluid conduit means 48 extending between ports 19 and 22 with this conduit 48 normally being closed by control valve 20 that is biased toward its closed position by coiled control spring 21. Conduit 48 communicates with the interior of bore 49 wherein actuating piston 10 is mounted. The latter engages the left end of beam 8, while the right end of the latter is engaged by control piston 7 that is mounted in bore 50 which is positioned so that control piston 7 moves generally parallel to actuating piston 10. Thus, as the latter moves down, control piston 50 is forced upward. The upper end of control piston 7 is provided with an extension or tappet 24 for engaging the movable ball of control valve 20 and lifting same off its seat to provide a clear fluid conduit between input and output ports 19, 22. Front circuit 13 for operating front brakes 18, together with input port 19 are connected directly to the output of master cylinder 17, while output port 22 is connected directly to rear circuit 12 and rear brakes 23 operated thereby.

Operation of the brake pressure control system takes place as follows. Upon the actuation of brake pedal 43, pressure is exerted in master cylinder 17 to close switch 14 and thereby energize brake light 39 and pump 11. Pressure built up by master cylinder 17 is applied at an unreduced level to front circuit 13 to operate front brakes 18. At the same time, pressure from master cylinder 17 is applied to input 19 of main controller 6 to act directly upon actuating piston 10 driving the latter downward. This pivots beam 8 counterclockwise so that the right end thereof moves control piston 7 upward. The relationship between pistons 7 and 10 relative to the pivot engagement between beam 8 and surface 31 results in motion multiplication so that for a given downward displacement of actuating piston 10 there is a greater upward displacement of control piston 7.

Upward motion of the latter opens control valve 20 against the force of control spring 21 permitting pressurized fluid to be conducted from input port 19 to output port 22. The latter is connected directly to rear brake circuit 12 which operates rear brakes 23 and is also connected to the input of pump 11. While the force on pedal 43 is being increased, as a result of varying lever transmission and motion between actuating piston 10 and control piston 7, specific equilibrium is established and control valve 20 closes so that a further increase in pressure in front brake circuit 13 of unreduced pressure does not lead to any increase in pressure in rear brake circuit 12 of reduced pressure and the ideal characteristic curve 1 is obtained.

Pump 11 operates continuously while brake light switch 14 is closed and during its operation pumps fluid from rear brake circuit 12 of reduced pressure into front brake circuit of unreduced pressure, so that control valve 20 remains continuously activated by a circulating stream of brake fluid and as a result there is a continuous adaptation of the transmission ratio. Pumping of fluid by pump 11 is at a volume which corresponds at least to the clearance volume per required relief time as required by widening of brake hoses and brake caliper, etc.

When brake pedal 43 is released, pressure in front brake circuit 13 decreases as does the pressure in rear brake circuit 12. In the case of the latter, pressure reduction is along the same ideal curve 1. When braking pressure is completely relieved, brake light switch 14 opens and pump 11 is de-energized.

Figure 3:
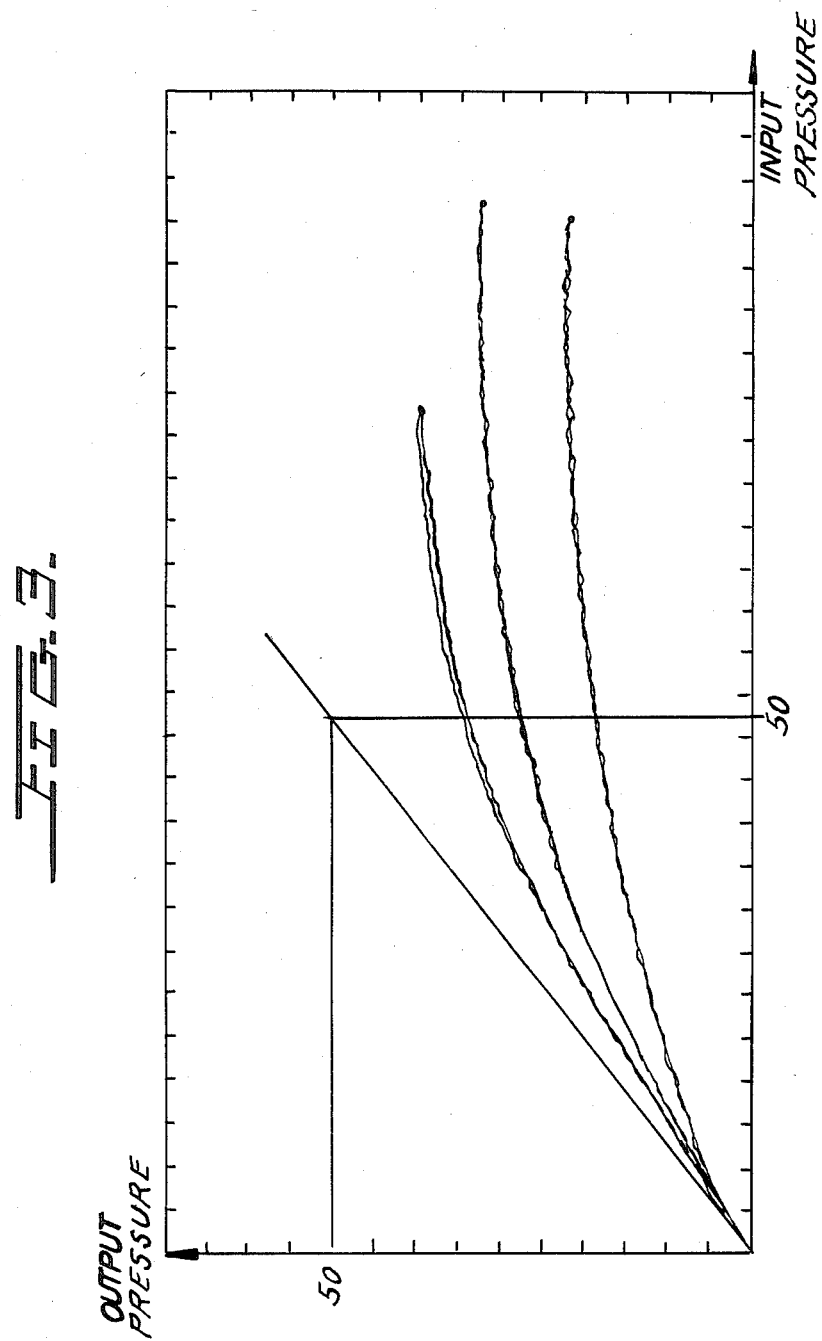
FIG. 3 is the characteristic hysteresis-free curve of the input-output pressure achieved with the brake pressure control system of FIG. 2.

The three lower curves of FIG. 3 are measurements of the characteristic curve for rear brake circuit 12 obtained under three different conditions of vehicle loading with a brake pressure control system constructed in accordance with teachings of the instant invention.

It should now be apparent to those skilled in the art that teachings of the instant invention may be used to eliminate or reduce hysteresis, even if the specific main controller 6 is not utilized.

Although the present invention has been described in connection with a preferred embodiment thereof, many other variations and modifications will now become apparent to those skilled in the art without departing from the scope of the invention. It is preferred, therefore, that the present invention be limited not by the specific disclosures herein, but only by the appended claims.

What is claimed is:

1. A brake-pressure control system for vehicles having front and rear wheels, said system including:
   hydraulic braking front and rear circuits for stopping the respective front and rear wheels;
   a proportioning controller means operatively connected to said rear circuit operable to supply reduced braking pressure to said rear circuit compared to unreduced braking pressure in said front circuit as a function of loading referred to the front of said vehicle;
   braking means for pressurizing said circuits to stop said wheels;
   a pump means which when actuated pumps brake fluid from said rear circuit to said front circuit; and
   switch means for actuating said pump means when pressure delivered by said braking means exceeds a predetermined level;
   said pump means being operable to deliver fluid at a rate to obtain substantially the same rear circuit pressure characteristic of braking pressure in said rear circuit compared with said unreduced braking pressure, whether said pressure delivered by said braking means is increasing or decreasing.

2. A brake-pressure control system as in claim 1, also including a light in circuit with said switch mean to indicate that braking is taking place.

3. A brake-pressure control system as in claim 1, also including a normally closed check valve interposed between said pump means and said front circuit and being arranged to prevent fluid flow from said front circuit to said pump means.

4. A brake-pressure control system as in claim 1, in which said pump means delivers a volume of fluid at a rate corresponding to at least the clearance volume per required relief time of the rear circuit.

5. A brake-pressure control system as in claim 1, wherein said proportioning controller means comprises a main controller having an input connected to said braking means and an output connected to said rear circuit;

said main controller including an actuating piston, a control piston, a pivot support, a beam extending between said pistons and mounted on a pivot provided by said pivot support, fluid conduit means extending between said input and said output, a control valve normally closing said conduit means and being openable through operation of said control piston, said pistons engaging said beam at locations on opposite sides of said pivot, said actuating piston communicating with said conduit means at a location between said control valve and said input;

said actuating piston being moved in a first direction by pressurized fluid applied at said input to pivot said beam about said pivot and thereby move said control piston in a second direction opposite to said first direction to open said control valve whereby pressurized fluid appears at said output and said rear circuit.

6. A brake-pressure control system as in claim 5, in which the pivot support is provided by a convex surface.

7. A brake-pressure control system as in claim 6, in which said convex surface is a curve of non-uniform radius, whereby a change in angular disposition of said beam results in moving of said pivot lengthwise of said beam for adjusting pressure characteristic at said rear circuit.

8. A brake-pressure control system as in claim 6, in which said proportioning controller means is operatively connected to the convex surface for moving same longitudinally of said beam.

9. A brake-pressure control system as in claim 7, in which said proportioning controller means is operatively connected to the convex surface for moving same longitudinally of said beam.

10. A brake-pressure control system as in claim 5, also including a normally closed check valve interposed between said pump means and said front circuit and being arranged to prevent fluid flow from said front circuit to said pump means.

11. A brake-pressure control system as in claim 10, also including a light in circuit with said switch means to indicate that braking is taking place.

12. A brake-pressure control system as in claim 5, in which said pump means delivers a volume of fluid at a rate corresponding to at least the clearance volume per required relief time of the rear circuit.

13. A brake-pressure control system as in claim 1 wherein the pressure characteristic of said rear circuit defines a relatively smooth curve.

* * * * *

UNITED STATES PATENT AND TRADEMARK OFFICE
CERTIFICATE OF CORRECTION

PATENT NO. : 4,720,150

DATED : January 19, 1988

INVENTOR(S) : Wilhelm Heubner

It is certified that error appears in the above-identified patent and that said Letters Patent is hereby corrected as shown below:

Title page:

Line [75] "Wilheim" should be --Wilhelm--

Signed and Sealed this

Twelfth Day of July, 1988

*Attest:*

DONALD J. QUIGG

*Attesting Officer*   *Commissioner of Patents and Trademarks*